United States Patent
Peemen et al.

(10) Patent No.: US 11,100,612 B2
(45) Date of Patent: Aug. 24, 2021

(54) ACQUISITION STRATEGY FOR NEURAL NETWORK BASED IMAGE RESTORATION

(71) Applicant: FEI Company, Hillsboro, OR (US)

(72) Inventors: Maurice Peemen, Rijsbergen (NL);
Pavel Potoček, Eindhoven (NL);
Remco Schoenmakers, Best (NL)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 16/405,536

(22) Filed: May 7, 2019

(65) Prior Publication Data

US 2020/0357097 A1    Nov. 12, 2020

(51) Int. Cl.
*G06T 5/00*    (2006.01)
*G06N 3/08*    (2006.01)

(52) U.S. Cl.
CPC ............ *G06T 5/002* (2013.01); *G06N 3/084* (2013.01); *G06T 2207/10056* (2013.01)

(58) Field of Classification Search
CPC ........... G06T 5/002; G06T 2207/10056; G06T 2207/220081; G06T 2207/220084; G06T 2207/10061; G06T 2207/10104; G06N 3/084; G06K 9/36; G06K 9/40
See application file for complete search history.

(56) References Cited

U.S. PATENT DOCUMENTS

2016/0171727 A1*  6/2016  Bouchard ............ G06K 9/6273
                                                    382/131
2017/0131536 A1*  5/2017  Potocek ................ G06T 11/206
2019/0311506 A1* 10/2019  Wenzel .................... G06T 5/006
2020/0090304 A1*  3/2020  Leem ..................... G06T 3/4053
2020/0175368 A1*  6/2020  Hu ............................ G06N 3/08

FOREIGN PATENT DOCUMENTS

EP            3404611 A1  * 11/2018    ............... G06T 7/70

OTHER PUBLICATIONS

Kurll et al., Noise2Void—Learning Denoising from Single Noisy Images, Nov. 2018, Cornell University, (Year: 2018).*
Buchholz et al. (Cryo-Care: Content-Aware Image Restoration for Cryo-Transmission , Oct. 2018,Cornell University (Year: 2018).*
Buchholz To et al: "Cryo-CARE: Content-Aware Image Restoration for Cryo-Transmission Electron Microscopy Data", arxiv.org, Cornell University Library, 201 Olin Library Cornell University Ithaca, NY 14853, Oct. 12, 2018 (Oct. 12, 2018), XP081064892, 5 pages.

(Continued)

*Primary Examiner* — Said M Elnoubi (57) ABSTRACT

Methods and systems for neural network based image restoration are disclosed herein. An example method at least includes acquiring a plurality of training image pairs of a sample, where each training image of each of the plurality of training image pairs are images of a same location of a sample, and where each image of the plurality of training image pairs are acquired using same acquisition parameters, updating an artificial neural network based on the plurality of training image pairs, and denoising a plurality of sample images using the updated artificial neural network, where the plurality of sample images are acquired using the same acquisition parameters as used to acquire the plurality of training image pairs.

18 Claims, 6 Drawing Sheets

(56) References Cited

OTHER PUBLICATIONS

EP20173113.0, Extended European Search Report, dated Jul. 16, 2020, 8 pages.
Jeffrey ME et al: "Improving electron micrograph signal-to-noise with an atrous convolutional encoder-decoder", Ultramicroscopy, 2019, vol. 202, pp. 18-25, XP085703849, ISSN: 0304-3991, DOI: 10.1 016/J.ULTRAMIC.2019.03.017.
Krull A et al: "Noise2Void—Learning Denoising from Single Noisy Images", arxiv.org, Cornell University Library, 201 Olin Library Cornell University Ithaca, NY 14853, Nov. 27, 2018 (Nov. 27, 2018), XP081199743, 9 pages.
Beyond a Gaussian Denoiser: Residual learning of deep CNN for Image Denoising, "K. Zhang, W. Zuo, Y. Chen, D. Meng, and L. Zhang", IEEE Transactions on Image Processing, vol. 26, No. 7, Jul. 2017.
FFDNet: Toward a Fast and Flexible Solution for CNN based Image Denoising, "K. Zhang, W. Zuo, and L. Zhang," IEEE Trans. on Image Processing, 2018.
Noise2Noise: Learning Image Restoration without clean data, "J. Lehtinen, J. Munkberg, J. Hasselgren, S. Laine, T. Karras, M. Aittala, and T. Aila", proceedings of International conference on Machine Learning, 2018.
Enhanced Deep Residual Networks for Single Image Super-Resolution, "B. Lim. S. Son, H. Kim, S. Nah, and K-M. Lee", proceedings of Computer Vision and Pattern Recognition (CVPR 2017).
Image denoising by sparse 3D transform-domain collaborative filtering, "Dabov, Kostadin; Foi, Alessandro; Katkovnik, Vladimir; Egiazarian, Karen" IEEE Transactions on Image Processing. 16 (8): 2080-2095, (2007).

* cited by examiner

ACQUISITION STRATEGY FOR NEURAL NETWORK BASED IMAGE RESTORATION

FIELD OF THE INVENTION

The invention relates generally to artificial intelligence (AI) enabled image restoration, and specifically to AI enabled noise reduction and sparse reconstruction.

BACKGROUND OF THE INVENTION

In many types of microscopy, noise is difficult to remove or reduce, which leads to less than desirable results. Further, the types of images users desire may make the noise even more difficult to manage. For example, in charged particle microscopy, the parameters of the charged particle beam and other image acquisition parameters can affect the noise in an image, but also may have adverse effects on the desired field of view and sample interaction. To further the example, a tradeoff between charged particle beam dwell time and noise exists. Specifically, short dwell times may be preferred to ensure there are no or minimal changes during image acquisition, such as drift. Short dwell times may also lead to quicker image acquisitions. A downside, however, is that images from short dwell times tend to be noisy and/or sparse, e.g., having pixels void of information, which is typically undesirable by end user. While long dwell times may reduce noise, e.g., increase signal to noise, and provide a less sparse image, the longer dwell times tend to increase image acquisition times and may further result in sample damage, especially with biological samples. Long dwell times typically incur drift during image acquisition, as well. These tradeoffs and issues are just a few that may affect noisy images.

End users typically desire large fields of view and/or three-dimensional volumes, which require long acquisition times (on the scale of a month in some examples) that is only further increased if long dwell times are used. As such, fast acquisition times with reduced noise are desirable. The acquisition time could be further reduced with sparse image acquisition. While various attempts for image restoration have been made over the years to solve this problem, the offered solutions have their own drawbacks, such as images overly smoothed or virtually unimproved images. As such, there remains a desire to solve the noisy image problem.

SUMMARY

Apparatuses and methods for neural network based image restoration are disclosed herein. Image restoration includes denoising images, sparse reconstruction of images, and combinations thereof. An example method for neural network based denoising at least includes acquiring a plurality of training image pairs of a sample, where each training image of each of the plurality of training image pairs are images of a same location of a sample, and where each image of the plurality of training image pairs are acquired using same acquisition parameters, updating an artificial neural network based on the plurality of training image pairs, and denoising a plurality of sample images using the updated artificial neural network, where the plurality of sample images are acquired using the same acquisition parameters as used to acquire the plurality of training image pairs.

An example apparatus for implementing neural network based denoising at least includes a charged particle microscope imaging platform; and a controller at least coupled to control the charged particle microscope imaging platform. The controller is coupled to a non-transitory computer readable medium including code that, when executed by the controller, causes the system to acquire a plurality of training image pairs of a sample, where each training image of each of the plurality of training image pairs are images of a same location of a sample, and where each image of the plurality of training image pairs are acquired using same acquisition parameters, update an artificial neural network based on the plurality of training image pairs, the artificial neural network included with or coupled to the system, and denoise a plurality of sample images using the updated artificial neural network, where the plurality of sample images are acquired using the same acquisition parameters as used to acquire the plurality of training image pairs.

Another embodiment of neural based image restoration is directed toward sparse reconstruction. An example method of sparse reconstruction at least includes acquiring a plurality of training image pairs of a sample, where each training image of each of the plurality of training image pairs are images of a same location of a sample but include different image pixels, and where each image of the plurality of training image pairs are acquired using same acquisition parameters, updating an artificial neural network based on the plurality of training image pairs, and reconstructing each of a plurality of sample images using the updated artificial neural network, where the plurality of sample images are acquired using the same acquisition parameters as used to acquire the plurality of training image pairs, and where each image of the plurality of sample images are sparse images.

BRIEF DESCRIPTION OF THE DRAWINGS

Like reference numerals refer to corresponding parts throughout the several views of the drawings.

DETAILED DESCRIPTION OF EMBODIMENTS

Embodiments of the present invention relate to neural network based image restoration. In one example, an artificial neural network may be trained on a small number of noisy images to be a denoiser, which is then used to denoise a larger data set of sample images. In such an example, the acquisition parameters used to acquire the small number of noisy images is also used to acquire the sample images, which ensures that the noise in both image sets is similar. In another example, an artificial neural network may be similarly trained to provide sparse reconstruction instead of denoising. In the sparse reconstruction example, the training images include sparse images that at least slightly overlap so that the network learns how to fill in the sparse images of a large data set of sparse sample images. However, it should be understood that the methods described herein are generally applicable to a wide range of different AI enhanced or enabled image restoration techniques, and should not be considered limiting.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Additionally, in the following discussion and in the claims, the terms "including" and "comprising" are used in an open-ended fashion, and thus should be interpreted to mean "including, but not limited to . . . ." The term "training image pairs" or "training pairs" refers to pairs of images of a same location of a sample and acquired using the same acquisition parameters. As used herein, the term "acquisition parameters" refers to settings of a charged particle microscope used to acquire one or more images, and at least includes beam dwell time per pixel, beam spot size, beam landing energy, but does not include the number of images acquired or a grid size used in acquiring the images. In general, the "acquisition parameters" of discussion herein are mainly those parameters that control the magnitude, including time, of the interaction of the charged particle beam with the sample. Additionally, the term "sparse training image pairs" or "sparse training pairs" refers to pairs of images of the same location on the sample, but which contain different patterns of scanned pixels, which are obtained using the same acquisition parameters.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In general, charged particle images, for example, include various amounts of noise. The various amounts of noise may be mostly based on a dwell time of the probing charged particle beam, but other factors may also influence the noise as well. In terms of dwell time, the longer the dwell time the less noise included, e.g., the greater the signal to noise ratio (SNR), but the shorter the dwell time the greater the noise, e.g., lower the SNR. While this tradeoff seems straightforward to acquire less noisy images, the type of sample and the volume of images desired additionally affects the dwell time calculus. For example, a soft, delicate sample, e.g., a biological sample, may be damaged by long dwell times. It should also be noted that biological samples may typically suffer worse SNR due to the lack of contrast in the image, which may counsel for longer dwell times. Further, the number of images needed to image a large area or a volume of a sample may be greatly increased by long dwell times. In some instances, a large number of images of a soft sample may be desired, which may result in long dwell times to account for the additional noise of the soft sample. Such an imaging workflow may lead to a month of image acquisition. Clearly, this is undesirable and a quicker, less damage prone image acquisition is desirable.

While prior solutions to the noise problem are available, the results are typically less than desirable. Such solutions may include classical denoising algorithms and even more recent deep learning based solutions. The classical approach typically is based on oversimplified assumptions about the actual noise in the sample images and result in over smoothing of the image. As such, information is lost. As for the deep learning approaches, the training data is typically not specific enough due mainly to training on different noise, which may be artificially distorted clean images. Additionally, these deep learning based denoising networks are trained with noisy images and associate clean images, but the associated noisy and clean images are acquired under different settings, which affect the network's denoising capabilities. Clearly, newer and better solutions are desired.

One solution to the above disclosed problem includes updating the training of a pre-trained blind denoiser, e.g., pretrained blind artificial neural network, using only noisy images (training image pairs) that include noise similar to that of sample images needing denoised. The pre-trained blind denoiser may be lightly trained using noisy and clean images, for example, but the updating may only use noisy image pairs that have system specific noise, which helps the denoiser provide clean images after being updated. Additionally, a large data set of sample images may be acquired under the same acquisition parameter, e.g., charged particle microscope system settings, as used to acquire the training image pairs. After the sample images are acquired, the updated denoiser is used to denoise the sample images.

Some advantages of this solution over previous solutions is the use of a small set of training images, which both improves the denoising capability of the denoiser and increases the training time. For example, the update training of the denoiser may take less than an hour. Further, by using short dwell times for both the training image pairs and the large data set of sample images, the overall time from image to data may be greatly increased. Moreover, the denoising may be much better than a conventional deep learning denoiser due to training on images that have system specific noise that the denoiser will encounter in the large data set of sample images. As such, the denoised images will be of better quality than they would otherwise.

As previously noted, this technique may also be used to reconstruct sparse images with only a small change in the training image pairs. Whereas the training image pairs for the denoiser are of a same location of a sample, the sparse training image pairs may have some overlap and some non-overlapping areas, which provides training that allows the sparse reconstruction network, e.g., artificial neural network, to fill in the sparse (blank) areas of an image.

Figure 1:
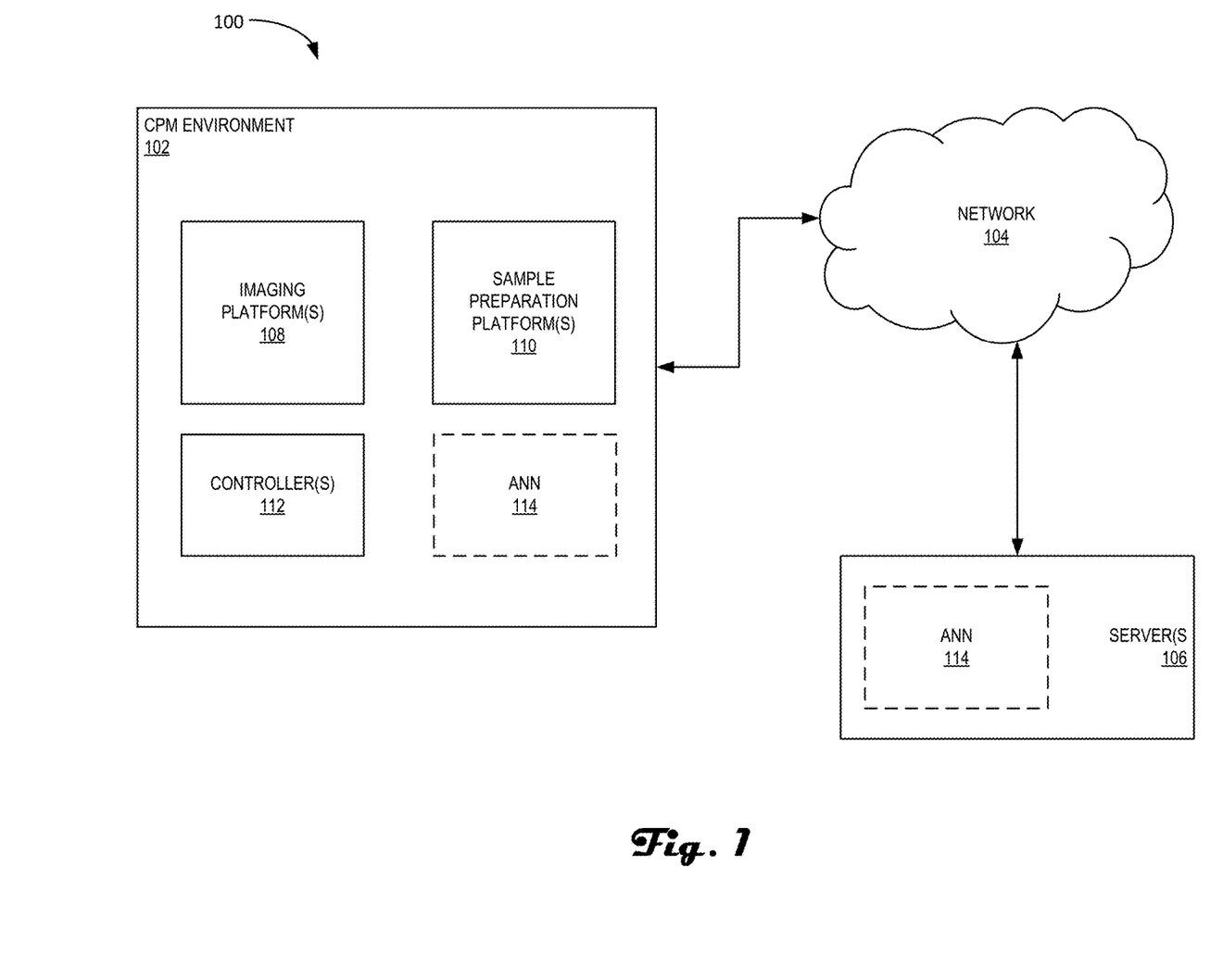
FIG. 1 is an example of a charged particle microscope system in accordance with an embodiment of the present disclosure.

FIG. 1 is an example of a charged particle microscope system 100 in accordance with an embodiment of the present disclosure. The charged particle microscope (CPM) system 100, or simply system 100, at least includes a CPM environment 102, a network 104, one or more servers 106, and an artificial neural network 114. The CPM system 100 may be used to investigate and image samples of various size and makeup. For one example, the CPM system 100 may be implemented, at least partially, at a commercial or research site and used to image various samples at the site. In some embodiments, the CPM system 100 may be distributed across various locations. For example, the CPM environment 102 may be located at a development location, the network 104 distributed locally, regionally, or nationally, and the server 106 located at a server farm and coupled to the CPM environment 100 via the network 104. Regardless of the organization of the CPM system 100, the system 100 may at least be used to implement one or more artificial neural networks (ANN) 114 along to perform various image restoration tasks, such as denoising and/or sparse reconstruction.

The CPM environment 102 includes any type of charged particle microscope, but the application of the neural network and image restoration techniques disclosed herein is not limited to charged particle microscopy, which is used for illustrative purposes only. Example CPMs include scanning electron microscopes (SEMs), transmission electron microscopes (TEMs), scanning transmission electron microscopes (STEMs), focused ion beams (FIBs), and dual beam (DB) systems that include both electron and ion beam capabilities, to name a few. The CPM environment 102 may be used to obtain electron or ion images of samples, some of which may be images of sequential slices of a sample such as to image a volume of a sample. Volume imaging may also be referred to slice and view, which includes imaging a surface of a sample, removing that surface, and imaging the newly exposed surface, which is repeated until a desired volume of the sample is imaged. The CPM environment 102 may include various aspects that can be contained in a single tool or that may be situated in separate tools. For example, the CPM environment 102 may include an imaging platform 108, e.g., an SEM, TEM, or STEM, a sample preparation platform 110, and one or more controllers 112. Of course, each platform 108 and 110 may include more than one microscope/sample preparation tools as well.

The imaging platform 108 is used to obtain images of samples, some of the samples may have been prepared by the sample prep platform 110, but that is not necessary. The images are obtained using an electron and/or ion source to irradiate the sample with a respective beam of charged particles. For example, an ion and/or electron beam column provides the respective beam of ions and/or electrons. In some examples, the charged particle beam imaging is obtained by a scanned beam, e.g., moved across the sample such as by rastering the beam, while other examples the charged particle beam is not scanned. Backscattered, secondary, or transmitted electrons, for example, are then detected and gray scale images formed based thereon. The images include gray scale contrast depending on the materials of the sample, where the changes in gray scale indicate changes in the material type or crystal orientation. The imaging platform 108 may be controlled by internal controls (not shown), controller 112, or a combination thereof.

The sample prep platform 110 forms some of the samples that are imaged by the imaging platform 108. Of course, imaged samples may also be formed by other tools (not shown). The sample prep 110 may, for example, be a DB system that uses a FIB to prepare and assist in the removal of a thin sample from a larger sample, such as by ion milling, ion induced etching, or a combination thereof, and other processes to process the sample for imaging. Other processes may include, but are not limited to, planarizing mills/etches, fiducial generation, cross-section formation, top-down lamella preparation, etc. The sample prep platform 110 may also include an electron imaging component that allows the sample prep process to be monitored, but the electron imaging component is not required. In some embodiments, the sample prep platform 110 may include other physical preparation aspects—lasers, cutting tools, resin encapsulation tools, cryogenic tools, etc.—that are used to prepare the sample for the imaging platform 108. The sample prep platform 110 may be controlled by internal controls (not shown), controller 112, or a combination thereof.

The network 104 may be any kind of network for transmitting signals between the CPM environment 102 and the server(s) 106. For example, the network 104 may be a local area network, a large area network, or a distributive network, such as the internet, a telephony backbone, and combinations thereof.

The servers 106 may include one or more computing platforms, virtual and/or physical, that can run code for various algorithms, neural networks, and analytical suites. While not shown, a user of the CPM environment 102 may have access to the servers 106 for retrieval of data, updating software code, performing analytical tasks on data, etc., where the access is through the network 104 from the user's local computing environment (not shown). In some embodiments, the user accesses image data stored on the servers 106, implements image restoration, e.g., denoising and/or sparse reconstruction, using the ANN 114 (which may be executed on the servers 106 or the CPM Environment 102) from their local computing environment.

In operation of a denoising embodiment, an imaging platform 108 is set to acquire images using desired acquisition parameters. The acquisition parameter may at least determine charged particle beam energy, beam spot size, and dwell time. Example dwell times may be from 0.3 μs to 3.0 μs. The dwell time determines how long the charged particle beam will impinge the sample at each pixel of the acquired image, and a short dwell time will reduce system drift, beam damage, and charging of the sample, to name a few benefits. As used herein, "pixel" may refer to a location within a viewable area of an acquired image and the beam may be moved from pixel to pixel to acquire images within the viewable area. The viewable area may be adjustable based on a desired field of view. Once the acquisition parameters are set, a small number of training image pairs of the sample are acquired. Each training image pair will include at least two images of a same location on the sample, which may also be called spot images or spot training pairs. Acquiring two or more spot training images of the same location provides information about the charged particle specific system noise. In some embodiments, the number of training image pairs can be from 100 to 1000, e.g., 200 to 2000 total images. The number of training image pairs acquired may be adjusted based on how close the noise in pre-training the ANN 114 is to the system specific noise in the training image pairs. If the noise is close, then fewer training image pairs may be needed, and vice versa.

After the small number of training image pairs are acquired, the pre-trained ANN 114 may be updated to fine tune the ANN 114 to the system specific noise in the training image pairs. The updating of the ANN 114 may only use the training image pairs, which due to the short dwell time will be noisy images. Further, the training image pairs will not be labeled as is customary for training artificial neural networks. Additionally, no associated clean images will be used in updating the training of the ANN 114. As such, ANN 114 may use back propagation for each training image pair to learn the noise of the system. This training technique may be referred to as noise-to-noise training, which takes advantage of the statistical nature of noise. The statistical nature of noise is based on the stance that many noise sources have a zero mean. As such, an average of multiple images of a same location may suppress the noise, revealing a clean image. Moreover, training on the small number of training image pairs allows for a fast training due to fast convergence that leads to a good match with the system specific noise.

Before, after or in parallel with updating the training of the ANN 114, a large data set of sample images may be acquired using the same acquisition parameters. This large data set may result in terabytes of data (e.g., 10,000 plus images) that need to be denoised. Due to using the same fast dwell time, the time to acquire all of the sample images may be much less than conventional large scale data set acquisitions. Post-acquisition of the sample images and updating the ANN 114, the sample images may be denoised. This denoising step may be performed at the system 100, or at the serer 106, and may be initiated by a user at any time.

While the above example operation was discussed in the denoising environment, the sparse reconstruction technique could similarly be implemented with changed made to the sparse training image pairs as noted above. Other than the differences between the training images, the process of denoising and sparse image reconstruction (which can collectively be referred to as image restoration) is similar, if not the same. In terms of sparse reconstruction, sparse images, e.g., images with missing data, may be completed, e.g., the missing data filled in, by a trained artificial neural network.

While the images provided to the ANN 114 is described as being obtained by imaging platform 108, in other embodiments, the images may be provided by a different imaging platform and provided to the ANN 114 via the network 104. For example, both the training image pairs and sample images may be provided to the servers 106 via the network, then the updating of the ANN 114 may be performed using the training image pairs prior to denoising the sample images. As long as the acquisition parameters used to acquire the training images and the sample images, the charged particle system used for imaging does not need to be co-housed with the ANN 114.

In one or more embodiments, the ANN 114, which may also be referred to as a deep learning system, is a machine-learning computing system. The ANN 114 includes a collection of connected units or nodes, which are called artificial neurons. Each connection transmits a signal from one artificial neuron to another. Artificial neurons may be aggregated into layers. Different layers may perform different kinds of transformations on their inputs.

One type of ANN 114 is a convolutional neural network (CNN). A CNN is conventionally designed to process data that come in the form of multiple arrays, such as a color image composed of three two-dimensional arrays containing pixel intensities in three color channels. Example architecture of a CNN is structured as a series of stages. The first few stages may be composed of two types of layers: convolutional layers and pooling layers. A convolutional layer applies a convolution operation to the input, passing the result to the next layer. The convolution emulates the response of an individual neuron to visual stimuli. A pooling layer combines the outputs of neuron clusters at one layer into a single neuron in the next layer. For example, max pooling uses the maximum value from each of a cluster of neurons at the prior layer. In one or more embodiments, the ANN 114 is a CNN configured to reconstruct an image, such as through denoising the image and/or sparse reconstruction of the image.

Figure 2:
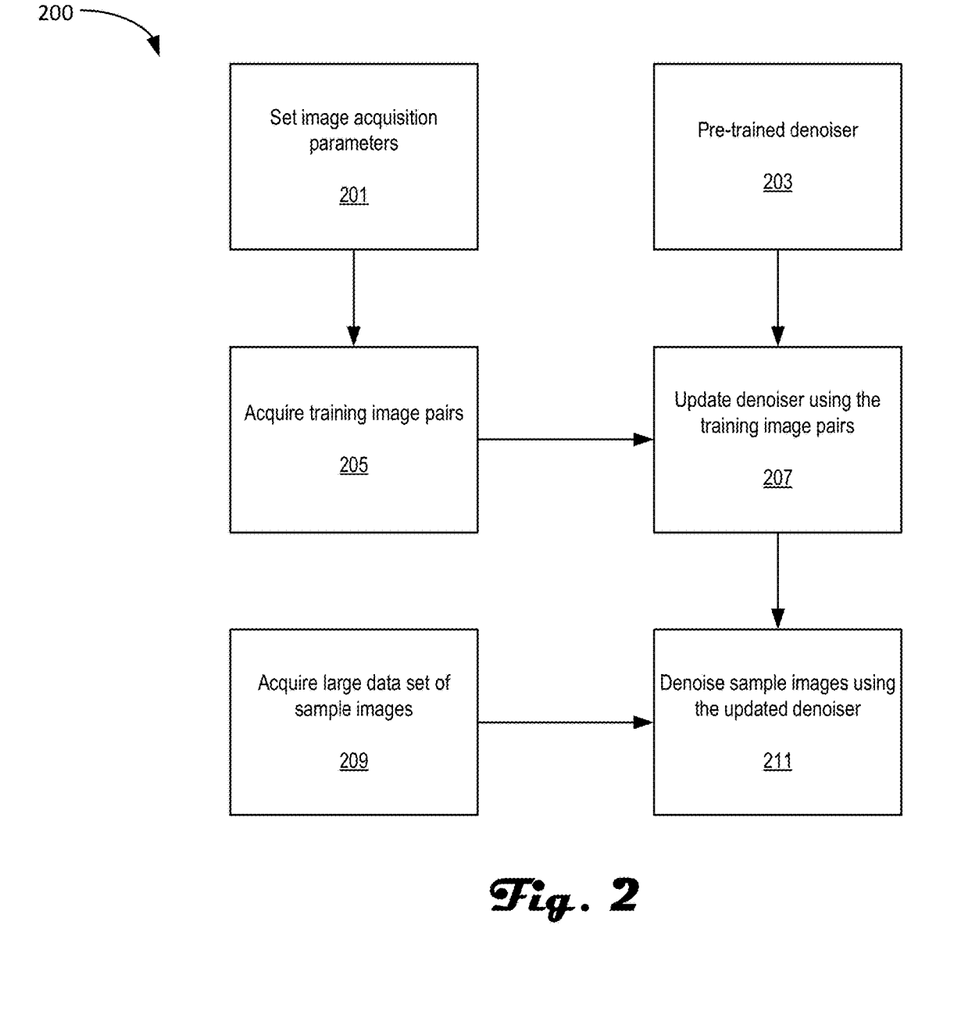
FIG. 2 is an example method for denoising images in accordance with an embodiment of the present disclosure.

FIG. 2 is an example method 200 for denoising images in accordance with an embodiment of the present disclosure. The method 200 may be implemented in part by a charged particle microscope system and further in part on one or more processing cores able to receive data from the charged particle microscope system. An example charged particle microscope system being system 100. Of course, other charged particle microscope systems could be used as well. In general, the method 200 retrains or updates an ANN, such as the ANN 114, based on a small number of training image pairs, then a large data set of sample images may be denoised using the retrained/updated ANN.

The method 200 may begin at process block 201, which includes setting image acquisition parameters. For example, image acquisition parameters, such as electron beam dwell time, electron beam landing energy, beam spot size, etc. In some embodiments, dwell time may be the biggest factor affecting image quality and should be the same for all images acquired for use with the method 200. For example, a short (e.g., 0.3 μs dwell time) helps limit or reduce drift occurring during image acquisition and further speeds up the image acquisition process. Limiting drift helps keep the underlying image signal, e.g., the image without the noise, the same for images of a same location, and the increased speed of the image acquisition process result in obtaining data faster and may further limit sample damage, if it is a sensitive sample.

Process block 201 may be followed by process block 205, which includes acquiring training image pairs. The training image pairs may be pairs of images of a same spot of a sample, and each image in each image pair will have different noise. The number of training image pairs acquired may be relatively small, especially in relation to the number of sample images acquired later, but the number acquired may also be affected by a similarity of image noise used to pre-train the denoiser model, e.g., ANN.

The method 200 further includes the process block 203, which includes providing a pre-trained denoiser. The performance of this block may be performed in parallel with, before or after process blocks 201 and 205. The pre-trained denoiser model is a pre-trained ANN, such as ANN 114, trained to denoise images. In general, the pre-training may be done using any noisy images and do not need to be of the same sample type images in process block 205 or even have the same type of noise. However, the more similar the training images are to those acquired in process block 205 with respect to noise, the quicker the re-training or updating the denoiser may be.

Process block 203 may be followed by process block 207, which includes updating the denoiser using the training image pairs. The denoiser, i.e., ANN 114, is updated using images having noise similar to the noise that will be included in the sample images. By updating the denoiser with images having similar noise to that of the sample images, the denoise more robustly provides clean images, e.g., reduced noise images, in return. Further, since each training image pair is of the same spot and only differ due to noise, the denoiser learns the noise and is more capable of removing the noise without affecting the rest of the image.

The method 200 further includes process block 209, which includes acquiring a large data set of sample images. The sample images should be acquired using the same acquisition parameters used to acquire the training image pairs to ensure the sample images include similar noise. The process block 209 may be performed any time after process block 201 is performed, such as before, after or in parallel with process blocks 203 through 207. The large data set of sample images will be of the same sample as used to obtain the training image pairs, but will cover a much larger area or volume of the sample. In general, the number of sample images will be substantially more than the number of training image pairs. For example, the number of sample images may easily be over 10 k images and result in terabytes of data.

Process blocks 209 and 207 may be followed by process block 211, which includes denoising the sample images using the updated denoiser. The denoising of the sample images using the denoiser, e.g., ANN, may be done as the sample images are obtained by the ANN couple to the charged particle microscope, or the denoising of the images may be performed at a user's desktop computer coupled to access the sample images and the ANN.

Figure 3:
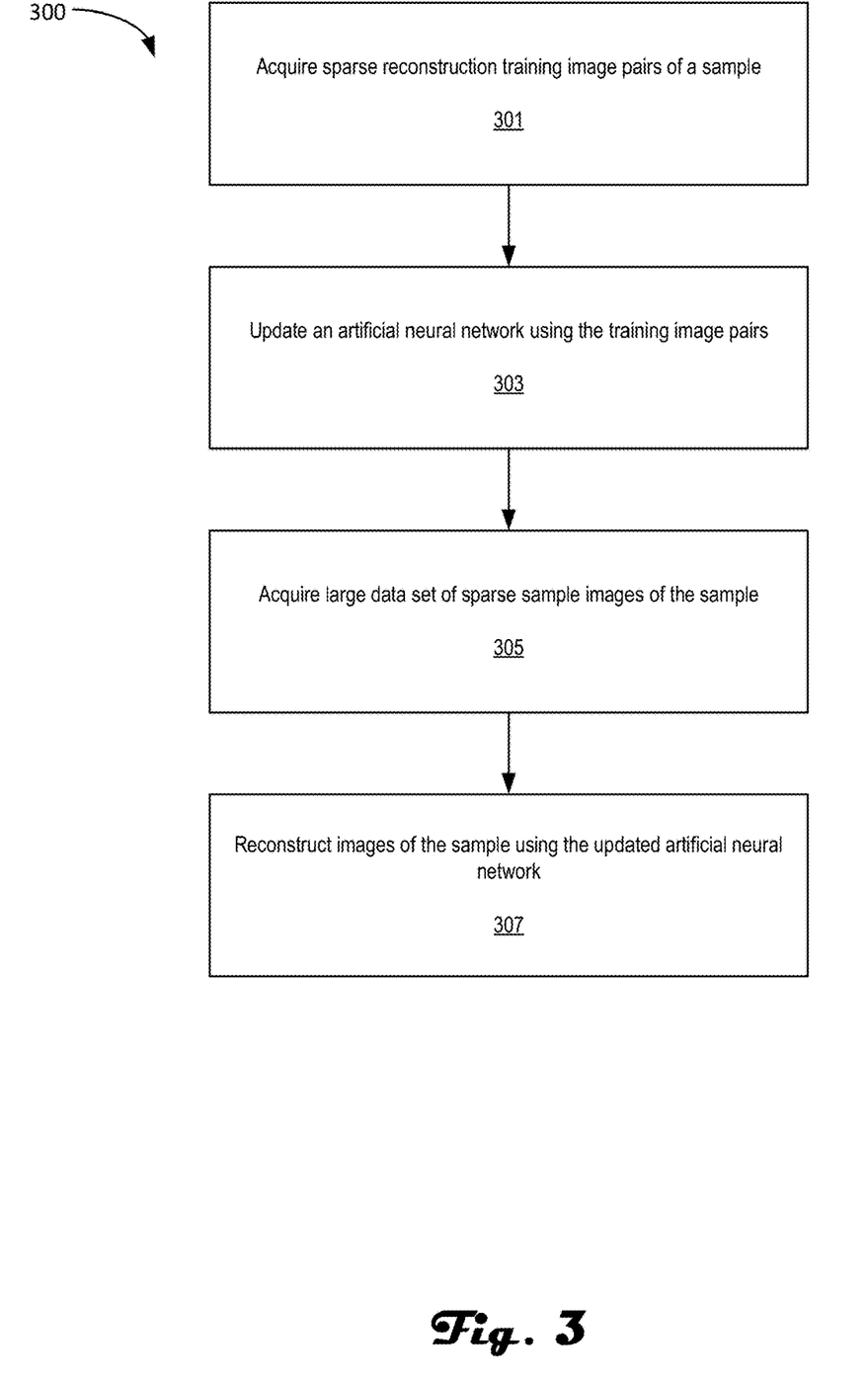
FIG. 3 is an example method for sparse image reconstruction in accordance with an embodiment of the present disclosure.

FIG. 3 is an example method 300 for sparse image reconstruction in accordance with an embodiment of the present disclosure. The method 300 may be implemented by a charged particle microscope system, such as system 100, or by one or more computing environments coupled to receive images from a charged particle microscope system. In general, the method 300 may reconstruct sparse images to provide a complete image. For example, an image including 10 to 20% pixels having information may be reconstructed to provide full 100% of the pixels with information of the sample.

Additionally, the method 300 may be implemented by an ANN, such as ANN 114, using similar techniques employed to denoise images as discussed in method 200. The sparse reconstruction uses a similarly trained ANN to that of the method 200 with only a slight difference between the training image pairs used in the methods 200 and 300.

The method 300 may begin with process block 301, which includes acquiring sparse reconstruction training image pairs of a sample. The sparse reconstruction training image pairs will be pairs of images of overlapping spots of the sample, but they are not of the exact same spot. Each pair should have an overlapping area and an non-overlapping area so that the ANN is trained to fill in the sparse or absent areas from images. For example, one image of a training pair may include data from pixels 1, 3, and 5 and the other image of the training pair may include data from pixels 2, 4, and 5. Alternatively or additionally, the training image pairs are of the same spot on the sample, but each picture of a training pair uses/includes a different mix of pixels from the image of that spot such that there is no overlap in pixels. As in the method 200, the number of sparse training image pairs may be small, especially compared to the number of sample images.

Process block 301 may be followed by process block 303, which includes updating an artificial neural network using the sparse training image pairs. The training pairs will be provided to a pre-trained ANN to be updated for sparse reconstruction. The pre-trained ANN may be partially trained to reconstruct images and may be trained using sparse images and associated full images, for example.

Process block 303 may be followed by process block 305, which includes acquiring a large data set of sparse sample images of the sample. The sparse images may be acquired using the same parameters as used to acquire the training image pairs. While process block is shown to be performed after process block 303, in other embodiments, process block 305 may be performed prior to or in parallel with process block 303.

Process block 305 may be followed by process block 307, which includes reconstructing the sample images using the updated artificial neural network. The updated ANN will reconstruct the sparse images by determining what the missing data should be and included it with an associated output image.

Figure 4:
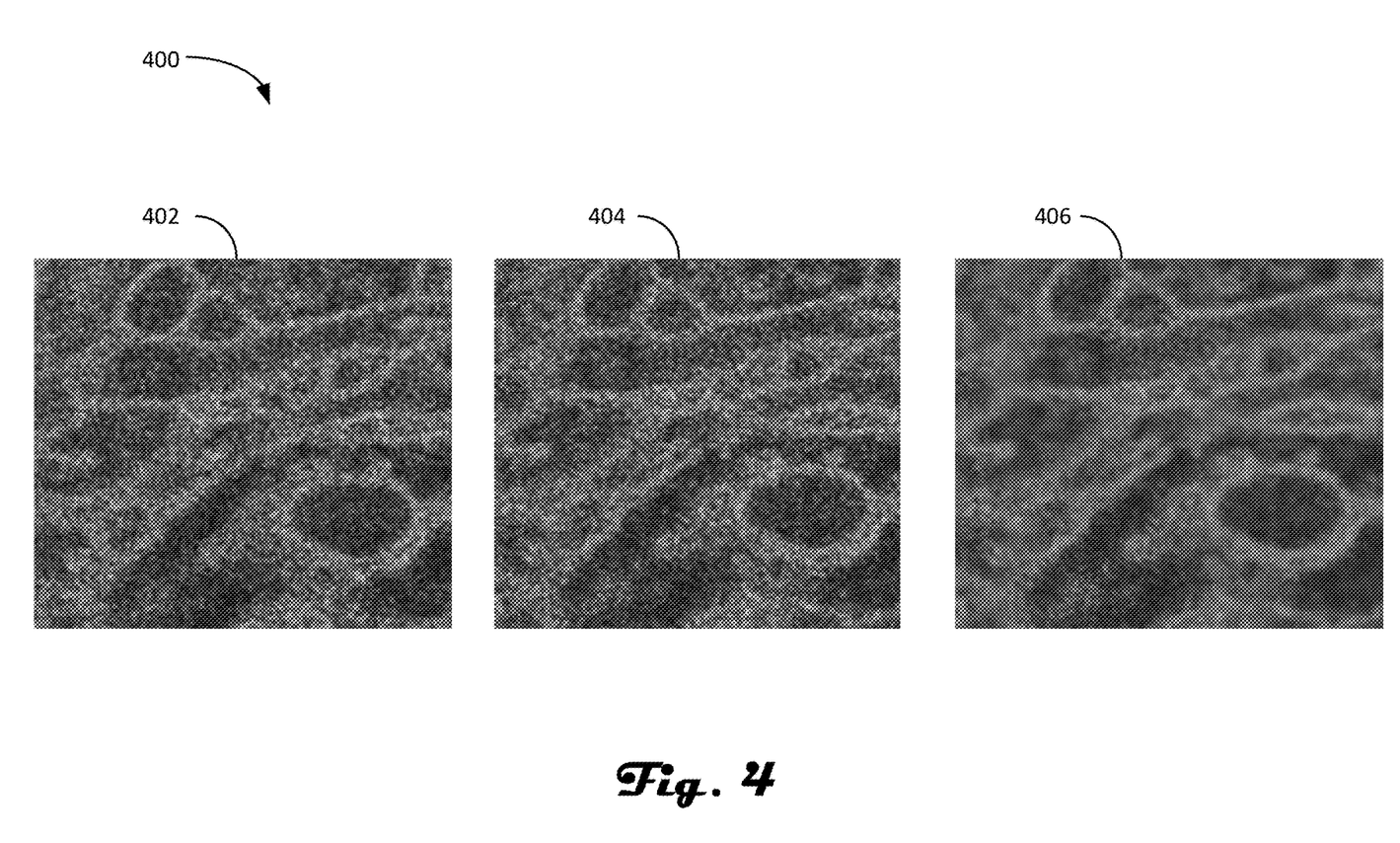
FIG. 4 is an example image sequence showing denoising of images in accordance with an embodiment of the present disclosure.

FIG. 4 is an example image sequence 400 showing denoising of images in accordance with an embodiment of the present disclosure. The image sequence 400 includes a training image pair and an associated denoised image provided by an updated denoiser. The images 402 and 404 are example noisy images of a same location of a sample, e.g., a training image pair, and are used in updating a denoiser, such as in process block 207 of method 200. The image 406 is an example denoised image of the same location having been denoised by the updated denoiser. While the example image 406 is blurry in some areas, the overall image includes much less noise than the noise shown in images 402 and 404.

Figure 5:
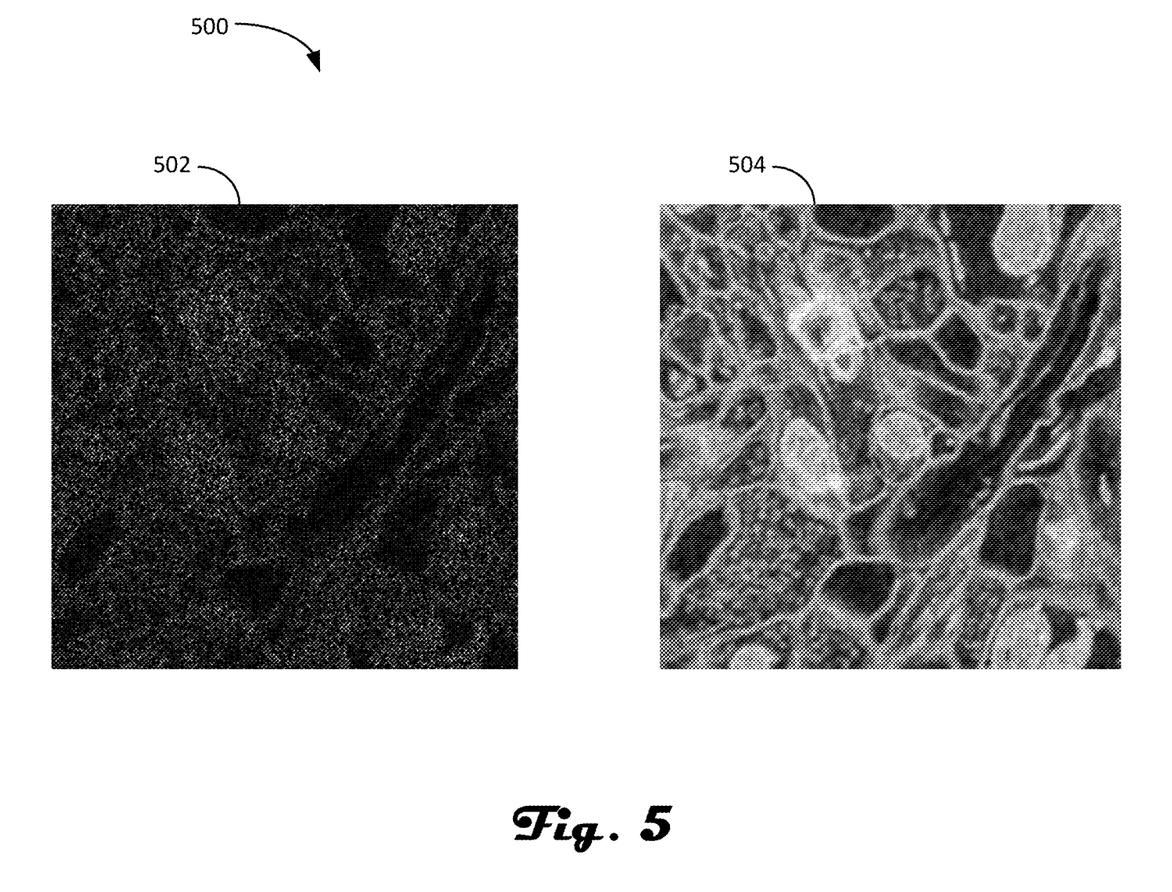
FIG. 5 is an example image sequence showing sparse reconstruction in accordance with an embodiment of the present disclosure.

FIG. 5 is an example image sequence 500 showing sparse reconstruction in accordance with an embodiment of the present disclosure. The image 502 is a sparse image of a sample and may be part of a large data set of sample images and/or one image of a training image pair. In contrast, the image 504 is a reconstructed image provided by a trained ANN, such as by process block 307 of method 300.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors or graphics processing units (GPUs) programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
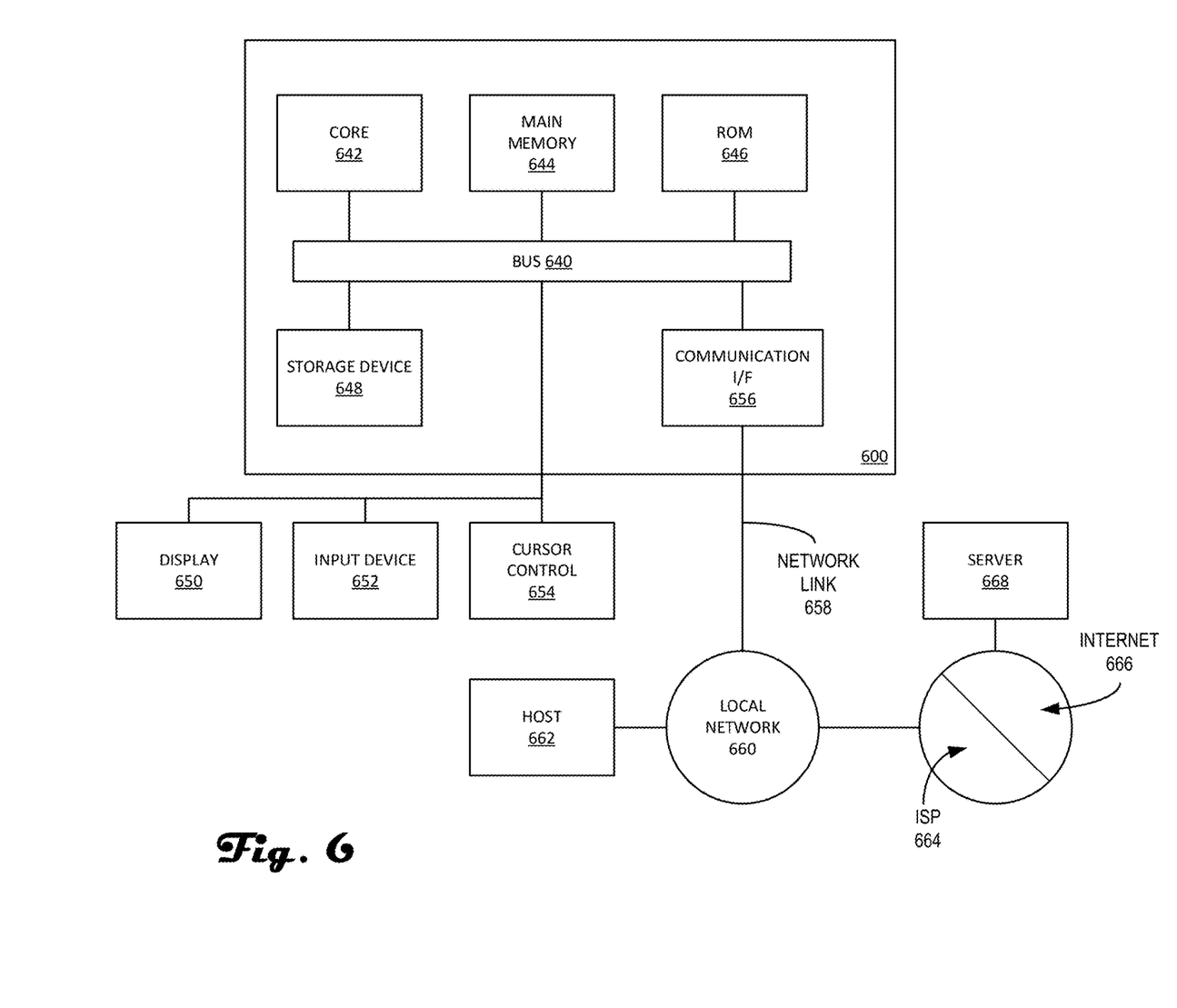
FIG. 6 is an example functional block diagram of a computing system 600 in accordance with an embodiment of the present disclosure.

For example, FIG. 6 is a block diagram that illustrates a computer system 600 upon which an embodiment of the invention may be implemented. The computing system 600 may be an example of the computing hardware included with CPM environment 102, such a controller 112, imaging platform 108, sample preparation platform 110, and/or servers 106. Additionally, computer system 600 may be used to implement the one or more neural networks disclosed herein, such as ANN 114. Computer system 600 at least includes a bus 640 or other communication mechanism for communicating information, and a hardware processor 642 coupled with bus 640 for processing information. Hardware processor 642 may be, for example, a general purpose microprocessor. The computing system 600 may be used to implement the methods and techniques disclosed herein, such as methods 200 and 300.

Computer system 600 also includes a main memory 644, such as a random access memory (RAM) or other dynamic storage device, coupled to bus 640 for storing information and instructions to be executed by processor 642. Main memory 644 also may be used for storing temporary variables or other intermediate information during execution of instructions to be executed by processor 642. Such instructions, when stored in non-transitory storage media accessible to processor 642, render computer system 600 into a special-purpose machine that is customized to perform the operations specified in the instructions.

Computer system 600 further includes a read only memory (ROM) 646 or other static storage device coupled to bus 640 for storing static information and instructions for processor 642. A storage device 648, such as a magnetic disk or optical disk, is provided and coupled to bus 640 for storing information and instructions.

Computer system 600 may be coupled via bus 640 to a display 650, such as a cathode ray tube (CRT), for displaying information to a computer user. An input device 652, including alphanumeric and other keys, is coupled to bus 640 for communicating information and command selections to processor 642. Another type of user input device is cursor control 654, such as a mouse, a trackball, or cursor direction keys for communicating direction information and command selections to processor 642 and for controlling cursor movement on display 650. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 642 executing one or more sequences of one or more instructions contained in main memory 644. Such instructions may be read into main memory 644 from another storage medium, such as storage device 648. Execution of the sequences of instructions contained in main memory 644 causes processor 642 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 648. Volatile media includes dynamic memory, such as main memory 644. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 640. Transmission media can also take the form of acoustic or light waves, such as those generated during radio-wave and infra-red data communications.

Various forms of media may be involved in carrying one or more sequences of one or more instructions to processor 642 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 640. Bus 640 carries the data to main memory 644, from which processor 642 retrieves and executes the instructions. The instructions received by main memory 644 may optionally be stored on storage device 648 either before or after execution by processor 642.

Computer system 600 also includes a communication interface 656 coupled to bus 640. Communication interface 656 provides a two-way data communication coupling to a network link 658 that is connected to a local network 660. For example, communication interface 656 may be an integrated services digital network (ISDN) card, cable modem, satellite modem, or a modem to provide a data communication connection to a corresponding type of telephone line. As another example, communication interface 656 may be a local area network (LAN) card to provide a data communication connection to a compatible LAN. Wireless links may also be implemented. In any such implementation, communication interface 656 sends and receives electrical, electromagnetic or optical signals that carry digital data streams representing various types of information.

Network link 658 typically provides data communication through one or more networks to other data devices. For example, network link 658 may provide a connection through local network 660 to a host computer 662 or to data equipment operated by an Internet Service Provider (ISP) 664. ISP 664 in turn provides data communication services through the world wide packet data communication network now commonly referred to as the "Internet" 666. Local network 660 and Internet 666 both use electrical, electromagnetic or optical signals that carry digital data streams. The signals through the various networks and the signals on network link 658 and through communication interface 656, which carry the digital data to and from computer system 600, are example forms of transmission media.

Computer system 600 can send messages and receive data, including program code, through the network(s), network link 658 and communication interface 656. In the Internet example, a server 668 might transmit a requested code for an application program through Internet 666, ISP 664, local network 660 and communication interface 656.

The received code may be executed by processor 642 as it is received, and/or stored in storage device 648, or other non-volatile storage for later execution.

In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections. In addition, the values selected may be obtained by numerical or other approximate means and may only be an approximation to the theoretically correct/value.

What is claimed is:

1. A method to denoise charged particle images, the method comprising:

Acquiring, with a charged particle beam, a plurality of training image pairs of a sample, wherein each training image of each of the plurality of training image pairs are images of a same location of the sample, and wherein each image of the plurality of training image pairs are acquired using same acquisition parameters, wherein the acquisition parameters at least includes a dwell time of the charged particle beam;

updating an artificial neural network based on the plurality of training image pairs; and denoising a plurality of sample images using the updated artificial neural network, wherein the plurality of sample images are acquired using the same acquisition parameters as used to acquire the plurality of training image pairs.

2. The method of claim 1, wherein noise in each image of the plurality of training image pairs is noise specific to a charged particle microscope used to acquire the training image pairs.

3. The method of claim 2, wherein the acquisition parameters affects the noise specific to the charged particle microscope used to acquire the training image pairs.

4. The method of claim 1, wherein noise in each image of the plurality of training image pairs is similar to noise in each image of the plurality of sample images.

5. The method of claim 1, wherein updating an artificial neural network based on the plurality of training image pairs includes updating the artificial neural network based on noise specific to a charged particle microscope used to acquire the plurality of training image pairs and the plurality of sample images.

6. The method of claim 1, further including:

acquiring the plurality of sample images, wherein the sample images cover a larger area of the sample than does the plurality of training image pairs.

7. The method of claim 1, further including;

providing a pre-trained artificial neural network, the pre-trained artificial neural network not trained on images having noise similar to that in either the plurality of training pairs or the plurality of sample images.

8. The method of claim 1, wherein a number of images of the plurality of training image pairs is less than a number of images of the plurality of sample images.

9. The method of claim 1, wherein the plurality of training image pairs include spot images at different locations on the sample.

10. A system comprising:

a charged particle microscope imaging platform; and a controller at least coupled to control the charged particle microscope imaging platform, the controller coupled to a non-transitory computer readable medium including code that, when executed by the controller, causes the system to:

acquire a plurality of training image pairs of a sample, wherein each training image of each of the plurality of training image pairs are images of a same location of a sample, and wherein each image of the plurality of training image pairs are acquired using same acquisition parameters, wherein the acquisition parameters at least includes a dwell time of the charged particle imaging platform;

update an artificial neural network based on the plurality of training image pairs, the artificial neural network included with or coupled to the system; and denoise a plurality of sample images using the updated artificial neural network, wherein the plurality of sample images are acquired using the same acquisition parameters as used to acquire the plurality of training image pairs.

11. The system of claim 10, wherein noise in each image of the plurality of training image pairs is noise specific to a charged particle microscope used to acquire the training image pairs.

12. The system of claim 11, wherein the acquisition parameters affects the noise specific to the charged particle microscope used to acquire the training image pairs.

13. The system of claim 10, wherein noise in each image of the plurality of training image pairs is similar to noise in each image of the plurality of sample images.

14. The method of claim 10, wherein updating an artificial neural network based on the plurality of training image pairs includes updating the artificial neural network based on noise specific to a charged particle microscope used to acquire the plurality of training image pairs and the plurality of sample images.

15. The system of claim 10, wherein the computer readable medium further includes code that, when executed by the controller, causes the system to acquire the plurality of sample images, wherein the sample images cover a larger area of the sample than does the plurality of training image pairs.

16. The system of claim 10, wherein the computer readable medium further includes code that, when executed by the controller, causes the system to provide a pre-trained artificial neural network, the pre-trained artificial neural network not trained on images having noise similar to that in either the plurality of training pairs or the plurality of sample images.

17. The system of claim 10, wherein a number of images of the plurality of training image pairs is less than a number of images of the plurality of sample images.

18. The system of claim 10, wherein the plurality of training image pairs include spot images at different locations on the sample.

* * * * *